United States Patent
Christian et al.

(10) Patent No.: US 7,536,391 B2
(45) Date of Patent: May 19, 2009

(54) SYSTEM AND METHOD FOR URL VIRTUALIZATION AND MAPPING

(75) Inventors: Brian S. Christian, Redmond, WA (US); Todd Krabach, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 424 days.

(21) Appl. No.: 11/133,319

(22) Filed: May 20, 2005

(65) Prior Publication Data
US 2006/0265345 A1    Nov. 23, 2006

(51) Int. Cl.
G06F 17/30    (2006.01)
(52) U.S. Cl. ............... 707/10; 707/101; 707/E17.112; 709/203; 709/219
(58) Field of Classification Search ................ 707/10, 707/101, 104.1, E17.92, E17.112; 709/203, 709/219
See application file for complete search history.

(56) References Cited

U.S. PATENT DOCUMENTS

| | | | | |
|---|---|---|---|---|
| 5,434,974 | A * | 7/1995 | Loucks et al. ............... 707/101 |
| 5,659,729 | A * | 8/1997 | Nielsen ........................... 707/3 |
| 5,706,501 | A * | 1/1998 | Horikiri et al. ................ 707/10 |
| 5,774,660 | A * | 6/1998 | Brendel et al. .............. 709/201 |
| 5,961,645 | A * | 10/1999 | Baker ............................ 726/1 |
| 6,078,929 | A * | 6/2000 | Rao ............................ 707/200 |
| 6,502,243 | B1 * | 12/2002 | Thomas ....................... 725/110 |
| 6,557,024 | B1 * | 4/2003 | Saito et al. .................. 709/201 |
| 6,725,214 | B2 * | 4/2004 | Garcia-Chiesa ................ 707/3 |
| 6,804,700 | B1 * | 10/2004 | Terek et al. .................. 709/203 |
| 2003/0056224 | A1 * | 3/2003 | Stone .......................... 725/112 |
| 2003/0074472 | A1 * | 4/2003 | Lucco et al. ................. 709/245 |
| 2003/0208472 | A1 * | 11/2003 | Pham ............................ 707/2 |
| 2003/0229900 | A1 * | 12/2003 | Reisman ....................... 725/87 |
| 2004/0103426 | A1 * | 5/2004 | Ludvig et al. ................... 725/9 |
| 2005/0021862 | A1 * | 1/2005 | Schroeder et al. ........... 709/246 |

* cited by examiner

*Primary Examiner*—Leslie Wong
(74) *Attorney, Agent, or Firm*—Shook, Hardy & Bacon LLP

(57) ABSTRACT

A system and method are provided for URL virtualization. The system and method for URL virtualization provide a contextually relevant URL to a requesting agent. The system may include a browser parameter determination mechanism for matching incoming request header parameters with stored information indicative of a content version and a URL lookup mechanism for locating a contextual URL mapping to a non-contextual URL that leads to the requested content version. The system may additionally include navigation controls for navigating to the requested content version using the non-contextual URL and display controls for displaying the contextual URL to the requesting agent.

18 Claims, 5 Drawing Sheets

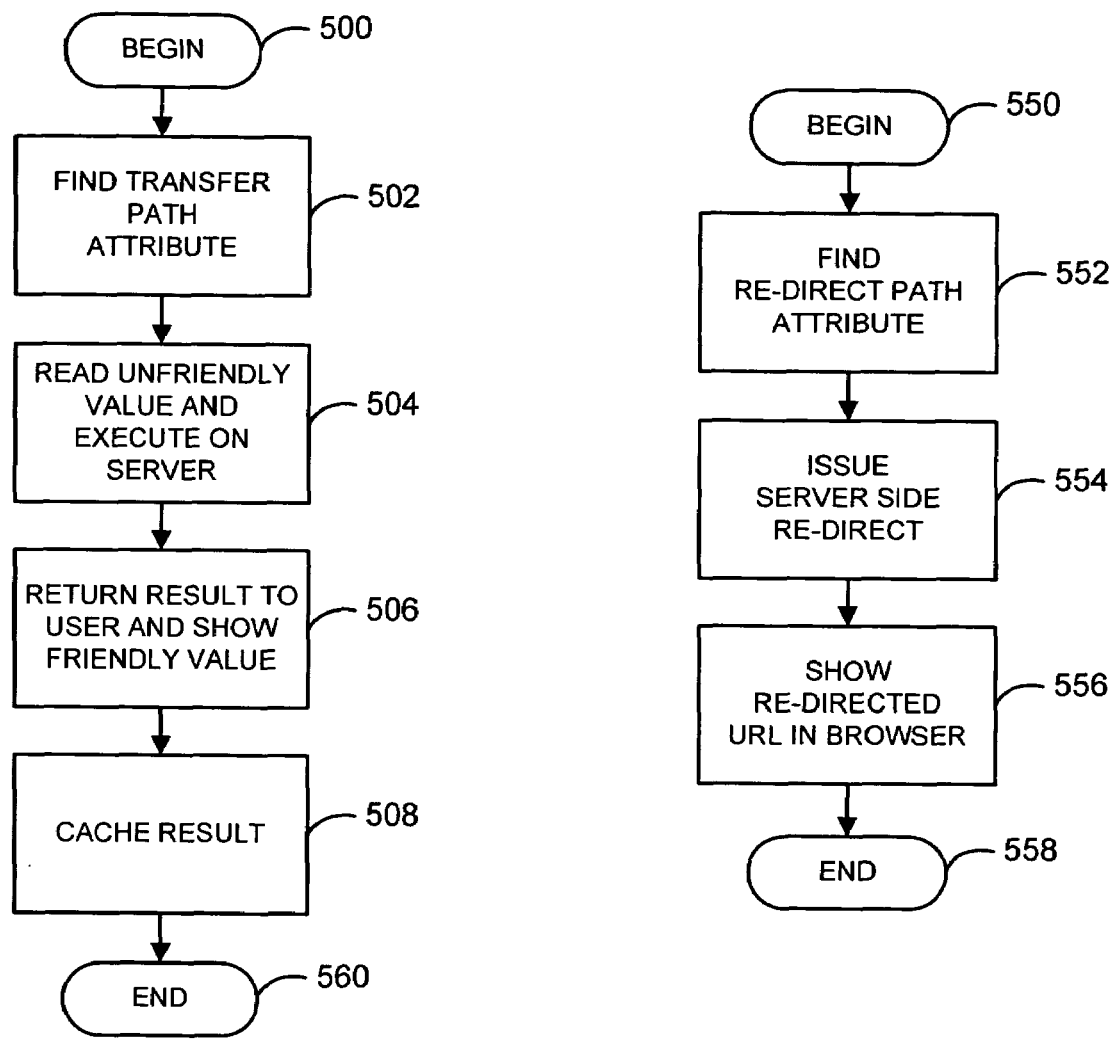

SYSTEM AND METHOD FOR URL VIRTUALIZATION AND MAPPING

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to a system and method for universal resource locator (URL) namespace virtualization. More particularly, embodiments of the invention relate to providing contextually relevant URLs through a mapping procedure.

BACKGROUND OF THE INVENTION

Computer users today are able to access large amounts of information over the Internet and other networks. As information sources, such as web sites available over the Internet, become more content rich and dynamic, the URLs that refer to pages within these web sites are becoming more and more cluttered and confusing. It is often difficult to discern the subject matter of a page from a URL.

As the World Wide Web has developed, URLs have become less contextually relevant. For instance in the earlier days of the World Wide Web, users could expect a URL such as "http://entertainment.msn.com/music/BritneySpears-Bio.htm". From viewing this URL, users could discern the type of content of the web page, which in this case would be a biography of Britney Spears. Thus, this URL was not only easy to read, but would also often provide some context for users. In other words, the text of the URL provided users with an idea of the content that would be exposed upon navigation.

Today with very large, database driven web sites users can expect to see a URL such as "http://entertainment.msn.com/music/artist.aspx?aid=32442&s=4&uid=true". This URL provides little or no information pertaining to the context of the referenced page.

Additionally, many businesses today that use commercial web sites to convey information have an interest in tracking statistics regarding visitor activity. Commercial web sites today often aim to track usage as measured by the number of users viewing specific pieces of content. Typically, commercial web sites implement tracking servers to track URL usage from a partner server having one or more links to the commercial web site. Generally, tracking information is encoded into a URL. Software in the tracking server logs information and redirects the user browser to the location of the link that the user wanted to reach. When a user clicks on a link in a partner web site after tracking, the user receives a completely random looking string of numbers and letters that has no relevance to the user's selected destination. After tracking, all of the links will have lost their context. In other words, a URL that pointed to "http://entertainment.msn.com/movies" may now point to "http://g.msn.com/ent.345/?ps=123&cm=321&ce=5". The tracking URL is typically a nonsensical combination of letters and/or numbers that provides no contextual information about the destination and bears little relation to the target URL content, thus causing confusion to the user.

In addition to user confusion, these contextually irrelevant URLs produced by large database driven systems and tracking servers have little meaning to search index systems that also rely on URL content for indexing. If a web site is indexed by a web search index system such as Google, the algorithms of the web search index system apply weight to context that can be inferred from a URL. Accordingly, if ten external partner web sites point to one page on a target web site and all of the external web sites have information in the URL that allows the heuristics of the web search index system to determine context, then that one page that has those ten links referencing it is going to rank much higher in search results than other pages.

User satisfaction is a critical success factor for a search engine. A solution is needed that allows contextually relevant URLs to be maintained to enable web sites to participate fully in web search engines and to enable users to discern target web site content from the URL. A system that can allow the use of contextually relevant URLs is currently in high demand for sites wishing to participate fully in web search engines. Because of the strong weight that many contemporary search algorithms apply to the URL of a given page being indexed, it has become increasingly important to provide clues as to the content of a web page within its destination URL.

BRIEF SUMMARY OF THE INVENTION

Embodiments of the present invention include a method for URL virtualization in order to provide a contextually relevant URL to a requesting agent. The method may include receiving a request from the requesting agent that leads to requested content through a non-contextual URL and searching for a corresponding contextual URL that maps to the non-contextual URL. The method may additionally include navigating to the requested content using the non-contextual URL and displaying the contextual URL to the requesting agent if the contextual URL is found.

In an additional aspect, a method is provided for URL virtualization in order to provide a contextually relevant URL to a requesting agent. The method may include receiving a request from the requesting agent that leads to requested content through a non-contextual URL. The method may additionally include reading request header parameters in order to select a version of the requested content and searching for a corresponding contextual URL. The method further may include navigating to the requested content version using the non-contextual URL and displaying the contextual URL and the requested content version to the requesting agent.

In yet a further aspect, a system for URL virtualization provides a contextually relevant URL to a requesting agent. The system may include a browser parameter determination mechanism for matching incoming request header parameters with stored information indicative of a content version and a URL lookup mechanism for locating a contextual URL mapping to a non-contextual URL that leads to the requested content version. The system may additionally include navigation controls for navigating to the requested content version using the non-contextual URL and display controls for displaying the contextual URL to the requesting agent.

BRIEF DESCRIPTION OF THE DRAWINGS

The present invention is described in detail below with reference to the attached drawings figures, wherein:

FIGS. 5A and 5B are flow charts illustrating details of a method for URL virtualization in accordance with an embodiment of the invention.

DETAILED DESCRIPTION OF THE INVENTION

I. System Overview

A system and method are provided for URL virtualization in order to provide contextually relevant URLs. The system and method virtualize the URL namespace of a web site to provide contextual URLs that are internally translated to the parameterized URLS required to drive today's dynamic, data driven web sites.

Figure 1:
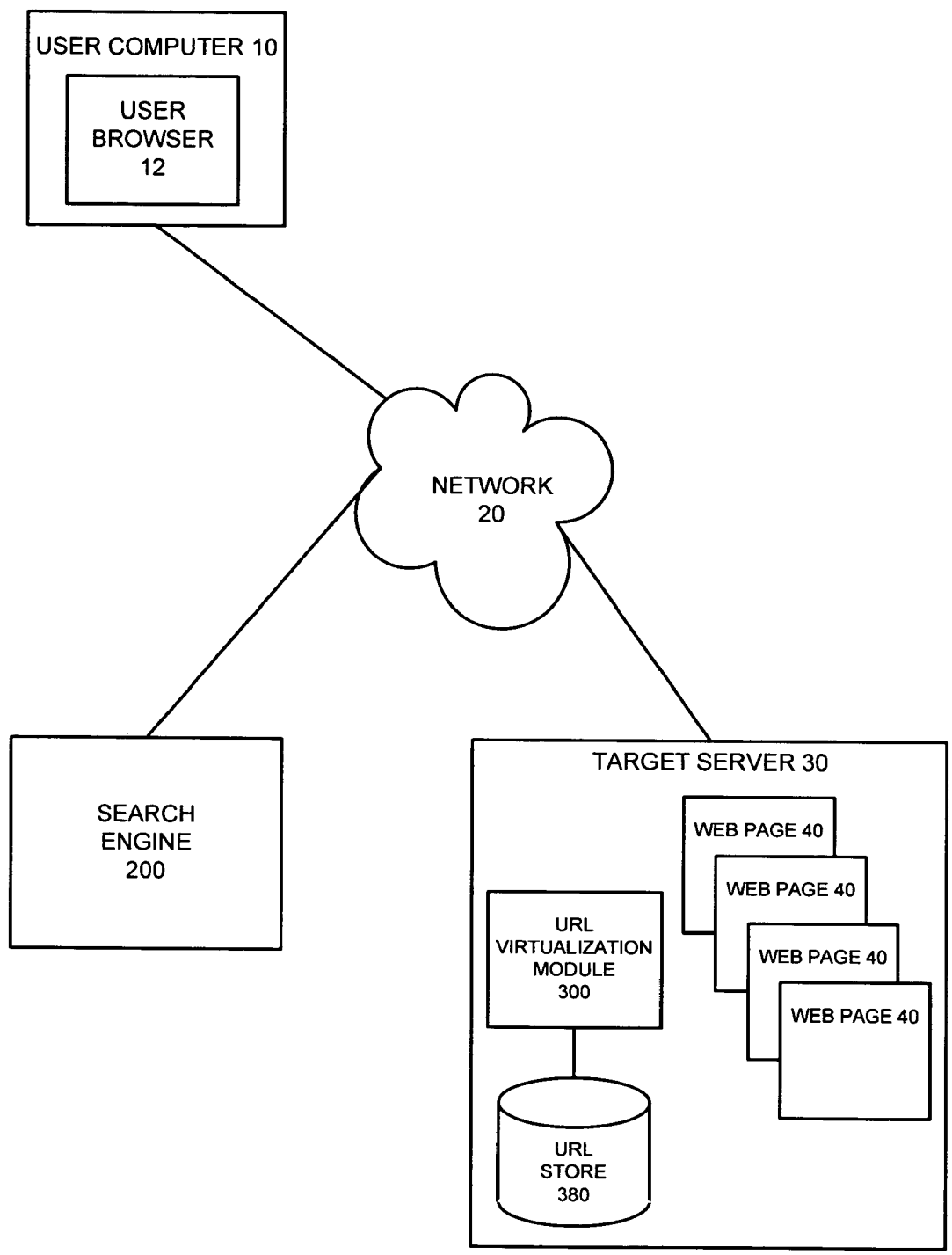
FIG. 1 is a block diagram illustrating an overview of a system in accordance with an embodiment of the invention.

FIG. 1 illustrates a user computer 10 and a user browser 12 connected over a network 20 with a search engine 200 and a target server 30. By implementing the user browser 12, the user may enter a URL that accesses information hosted by the target server 30. For example, the target server 30 may include a web site hosting web pages 40. The target server 30 may also host a URL virtualization module 300 and a URL storage area 380. The URL virtualization module 300 accesses the URL storage area 380 and converts a parameterized URL into a contextually relevant URL that provides insight into the content of a web page.

II. Exemplary Operating Environment

Figure 2:
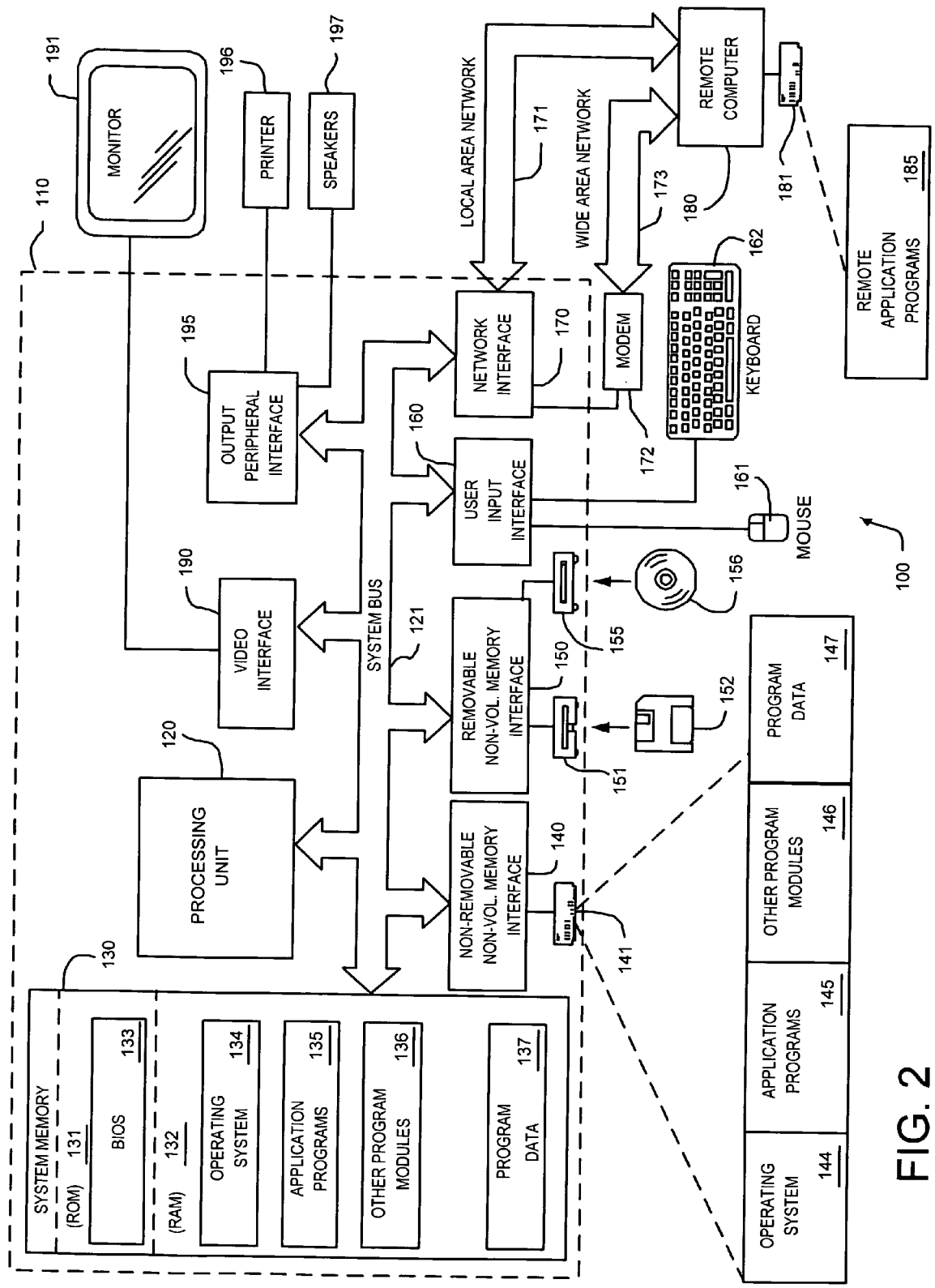
FIG. 2 is block diagram illustrating a computerized environment in which embodiments of the invention may be implemented.

FIG. 2 illustrates an example of a suitable computing system environment 100 on which the system for URL virtualization may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIG. 1 illustrates a system for URL virtualization including the URL virtualization module 300 and URL store 380 implemented on target server 30 and connected over the network 20 with the user computer 10 with user browser 12 and the search engine 200. As described above with respect to FIG. 2, the network 20 may be one of any number of different types of networks such as the Internet.

The URL virtualization module 300 provides components for directing incoming traffic to differing pieces of content based on request header values that indicate information such as the type of user browser 12 used to make the request. The URL virtualization module may act as a front door receptionist, internally redirecting an incoming request to content appropriate for a requesting browser type. Once installed, the URL virtualization module 300 derives its virtual URL space from an XML file or from a more dynamic database version of the same form of document that is stored in the URL store 380. For some implementations, an XML file may be adequate. However, with servers that access many web pages, a single file will likely be inadequate and a database version should be used.

Upon application startup or any other trigger event, the virtualization module 300 may read its virtual URL map file from the URL store 380 completely into memory for maximum performance. The URL store 380 should include a lookup table including a virtualized context rich URL to be substituted for a non-contextual URL, such as a parameterized non-contextual URL. The lookup table should further include either a transfer attribute or a redirect attribute for the context rich URL, as will be further explained below.

Figure 3:
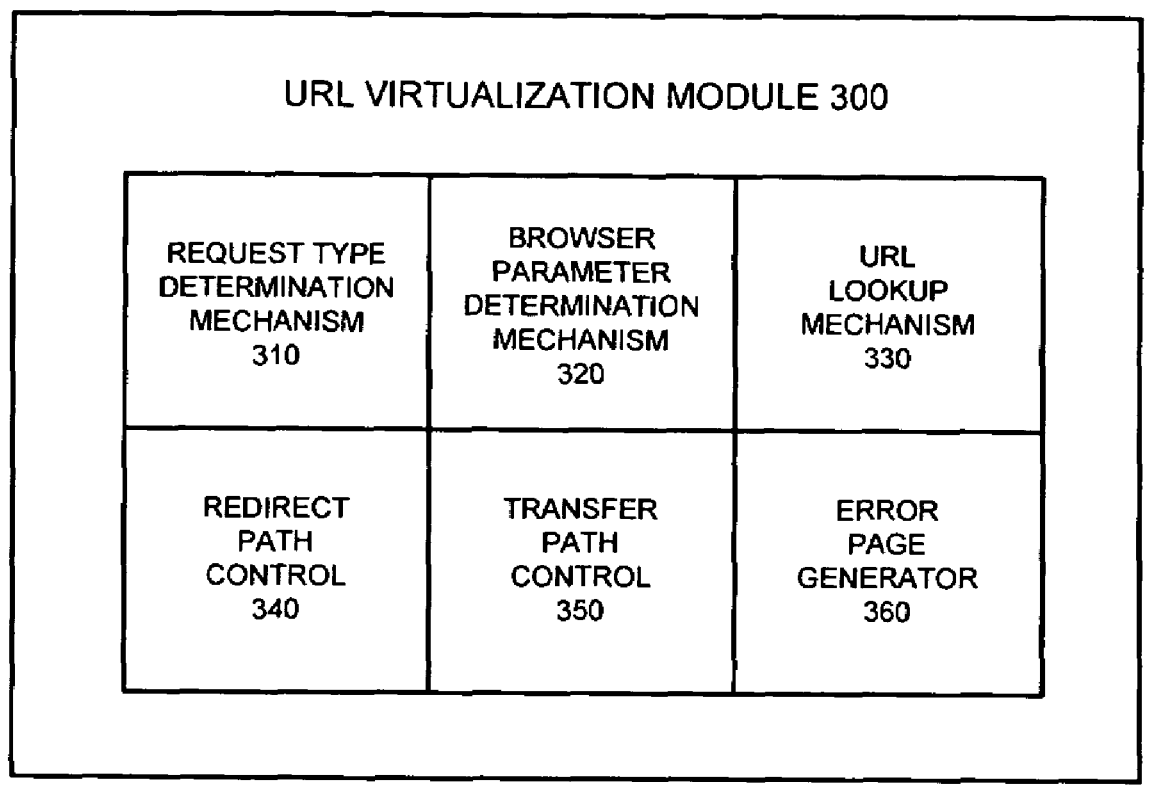
FIG. 3 is a block diagram illustrating a URL virtualization module in accordance with an embodiment of the invention.

FIG. 3 is a block diagram illustrating a URL virtualization module 300 in accordance with an embodiment of the invention. The URL virtualization module 300 may include a request type determination mechanism 310, a browser parameter determination mechanism 320, a URL lookup mechanism 330, a redirect path control 340, a transfer path control 350, and an error control 360.

The request type determination mechanism 310 may be included in some embodiments of the invention and may determine a type of request based on an extension included in the request. The request type determination mechanism 310 may be provided to specifically ignore certain types of requests such that the remainder the request pipeline will have the opportunity to serve that request. For instance, paths to images are less likely to require URL virtualization than paths leading to a document. Thus, the request type determination mechanism 310 can configure the URL virtualization module 300 to ignore requests of type .jpg/ .gif/ .bmp, etc. The following is a sample custom configuration setting for the request type determination mechanism 310.

(1) <ignoredExtensions>
<extension type=".jpg"/>
<extension type=".gif"/>
<extensiontype=".png"/>
<extension type=".bmp"/>
</ignoredExtensions>

The browser parameter determination mechanism 320 may optionally act on additional request parameters. The browser determination mechanism 320 may determine a browser type from request headers and direct certain browsers to alternate content. The matches can be based for example, on a header containing a specified value, beginning or ending with a specified value, or a match with a specified regular expression.

For instance, a server hosting an entertainment web site may access one version of the entertainment site that has an appearance customized for Internet Explorer. The server may also include another version having an appearance customized for browsing the web using a television. The browser parameter determination mechanism 320 can inspect incoming requests including certain headers that are in the request and determine that the request is coming from a television client and serve a completely different form of the same page using the map that directs traffic internally. Ultimately, because of the internal virtualization, the version viewed through a user browser will depend upon the particular browser. Although in each case, the user will see the same URL, the internal translation causes different content to be displayed depending on the browser. Furthermore, the browser parameter determination module 320 may be a pluggable module such that new code modules that can be plugged into the system to enable extensibility by third parties.

The URL lookup mechanism 330 may access the URL storage area 380 to determine whether a friendly or contextually relevant URL is available for a given request. For example, a user may receive a set of results through the user browser 12 from the search engine 200 and may select one of the results that leads to a non-contextual URL such as: "htt:// entertainment.msn.com/music/ artist.aspx?aid=32442&s=4&uid=true" The URL lookup mechanism 330 may search for a friendly or contextually relevant URL that accesses the same information. The contextually relevant URL should be one that is more human readable, such as http://entertainment.msn.com/music/BritneySpearsBio, which has the appearance of leading to a "BritneySpearsBio" directory. However, no separate physical file will be stored. The latter contextual URL may be shown to the user, but identical web content from the same file will be shown as would be shown with the former non-contextual URL.

If the URL lookup mechanism 330 finds a contextually relevant URL, it may inspect the result from this URL lookup mechanism, or use other heuristics to determine if the final URL is to be treated as a server-side redirect, or a server-side transfer. If the contextually relevant URL is determined to be a server-side transfer the URL lookup mechanism 330 may pass control to the transfer path control 350; otherwise it will pass control to the redirect path control 340. The URL lookup mechanism 330 may cause results of the lookup to be cached for even higher performance.

The redirect path control 340 may cause a simple server-side redirect to be issued to the user browser 12. In this case, the new, non-contextual URL is what would appear in the browser's address bar. While this technique may not represent a true virtualization of the URL, it offers a simple technique for managing server side redirects in conjunction with URL virtualization.

The transfer path control 350 may read the unfriendly or non-contextual URL to execute on the server. The transfer path control 350 sends the results of this execution to the requesting user browser 12, while the friendly or contextually relevant URL stays in the browser's address bar and it appears as any otherwise real or actual address.

Thus, the URL virtualization module 300, through the redirect path control 340 and the transfer path control 350, may include both navigation controls and display controls. The navigation controls determine the path for accessing the requested content and the display controls determine which URL to display to the requesting agent.

The error control 360 may operate when the URL lookup mechanism 330 fails to find a friendly or contextually relevant URL in the lookup table. If the contextual URL is not found, the error control may pass control to target server 30 to determine if a page is available to be served. If no page is available, the error control 360 may return a standard error page to the user browser 12.

The components described herein may be implemented in an ASP.net http module. Through the use of this technology, the URL virtualization module 300 may be inserted into the request pipeline and intercept all requests coming into a given web site regardless as to whether or not the requests will require use of the virtualization scheme.

The URL virtualization module 300 may be implemented by declaring the module in an applications web.config file as illustrated by the following example.

```
(2)  <httpModules>
        <add type="Wmis.Web.Runtime.UrlMapper,
        Wmis.Web.Runtime" name="UrlMapper" />
     </httpModules>
```

The following sample map file includes some of the components described above necessary for driving URL virtualization and in particular illustrates the mapping relationship between the request path and the transfer path. In one implementation, the map file may include, for example, attributes such as "requestPath," "transferPath," and "redirectPath."

```
(3)  <?xml version="1.0" standalone="yes"?>
     <Maps>
        <Map requestPath="Country"
           transferPath="Templates/Template3.aspx?data=
           21C34FD650244F/Country.xml&culture=en-us"/>
```

-continued

```
        <Map requestPath="Top40Radio"
           transferPath="Templates/Template3.aspx?data=-
           A88C55BDAFC8F/Top40Radio.xml&culture=enus"/>
        <Map requestPath="ShortFilms "
           transferPath="Templates/Template4.aspx?data=C5-
           2BABCF6BD290/IFILM.xml&culture=en-us"/>
     </Maps>
```

Figure 4:
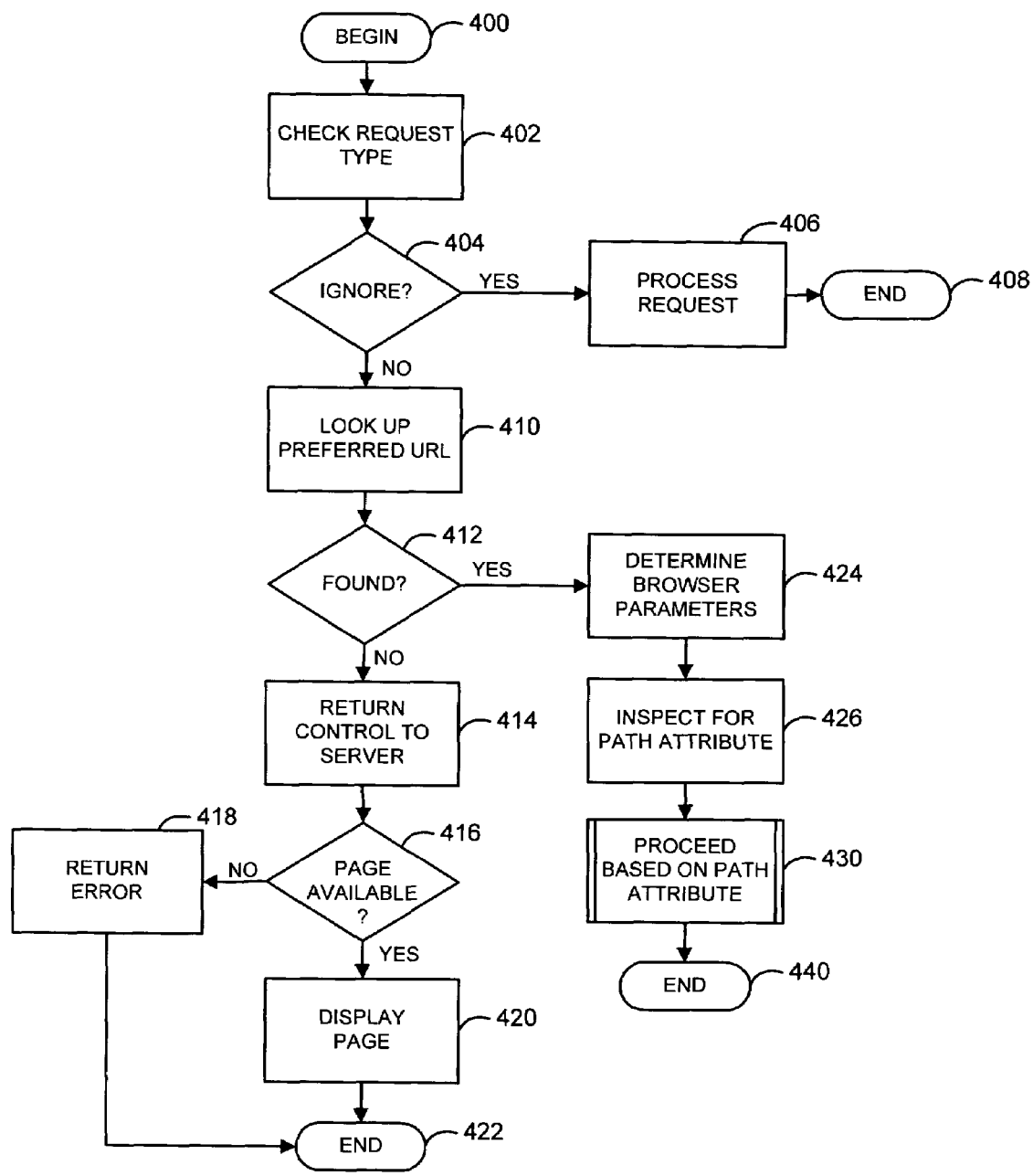
FIG. 4 is a method for URL virtualization in accordance with an embodiment of the invention.

FIG. 4 illustrates a method for URL virtualization in accordance with an embodiment of the invention. When control of the pipeline is passed to the URL virtualization module 300 to service a request, the sequence of events begins in step 400 and the URL virtualization module 300 checks a request type in step 402. If the request is of a type to be ignored in step 404 as determined by the request type determination mechanism 310, the system processes the request in step 406 and the processing ends in step 408. If the request type is not of a type to be ignored in step 404, the URL lookup mechanism 330 looks up the preferred or contextually relevant URL in a request path column of its map in step 410. If the preferred or contextually relevant URL is not found in step 412, the URL virtualization module 300 returns control to the server in step 414 to determine if a page is available for display. If a page is available for display in step 416, the system accesses the page for display in step 420 and the process ends in step 422. If no page is available for display in step 416, the system returns an error in step 418 before the process ends in step 422.

If in step 412, the preferred URL is found, the browser parameter determination mechanism 320 may determine browser parameters in step 424. In step 426, the URL lookup mechanism 330 determines whether the contextually relevant URL should be treated as a redirect or as a transfer, for example, by inspecting the contextually relevant URL for a path attribute or by any other appropriate heuristic. In step 430, the URL virtualization module 300 proceeds with the redirect or with the transfer, and the process ends in step 440.

FIGS. 5A and 5B illustrate a method for proceeding based on the located path attribute of step 430. FIG. 5A illustrates a method for proceeding if the path is determined to be a server-side transfer. In step 502, the URL virtualization module finds the transfer path attribute. In step 504, the URL lookup mechanism 330 reads the unfriendly or non-contextual URL and executes the result on the server 30. In step 506, the URL transfer path control 350 exposes the friendly and contextually relevant URL to the user. In step 508, the transfer path control 350 may cache the result and the process ends in step 510.

FIG. 5B illustrates a method for proceeding when the URL virtualization module 300 finds a redirect path attribute. The process begins in step 550 and the redirect path attribute is found in step 552. In step 554, the redirect path control 340 issues a server side redirect and in step 556, the redirected URL is shown in the user browser. The process ends in step 558.

As described above, embodiments of the URL virtualization system address the problem of indecipherable URLs directly. The URL virtualization module 300 creates visible URLs that have context and meaning to a user and a search engine. Furthermore, as described above, in embodiments of the invention, the contextually relevant URLs appear to point to a directory rather than to a specific file. Typically, if a user accesses the root of any website, for instance, www.xxx.com, the web server is configured in such a way as to serve default page which may be referenced by "default.html". The virtualization system accordingly deletes the unnecessary non-contextual characters.

By converting URLs in the manner described above, incoming traffic may be easily directed to traffic to differing pieces of content based on request header values that indicate information such as the type of browser used to make the request. The virtualization system acts as a front door receptionist by redirecting content requests to content appropriate for a specific browser type.

A further advantage of the above-described system is that the virtual URL map can disguise the structure of an entire web site and make the site more secure. The virtualization system hides the physical structure of the site to make it less vulnerable to hackers, who will be unable to view code within the site.

The virtualization system improves the user experience and facilitates web search engine inclusion since today's web search engines place a strong "weight", or importance, on the context of the URLs that they index. Providing clear clues as to the content of a page in its URL is strategically important for any web site that wishes to place high in search results.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method for URL virtualization to provide a contextually relevant URL to a requesting agent, the method comprising:
   receiving a request from the requesting agent, wherein the request includes a non-contextual URL;
   accessing a URL storage area to determine that the non-contextual URL maps to a contextual URL, wherein the contextual URL is more contextually relevant and more human-readable than the non-contextual URL;
   determining whether the contextual URL is a server-side transfer or a server-side redirect, wherein in a server-side redirect at least one of the non-contextual URL and contextual URL is mapped to an alternative URL;
   if the contextual URL is a server-side transfer, sending the content to the user browser for display and sending the contextual URL to the user browser for display in the user browser's address bar; and
   if the contextual URL is a server-side redirect, sending the content to the user browser for display and sending the alternative URL for display in the user browser's address bar.

2. The method of claim 1, further comprising reading request header parameters to determine a requested content version appropriate to the requesting agent.

3. The method of claim 1, further comprising determining a request type and bypassing the virtualization if the request is of a pre-selected type.

4. The method of claim 1, further comprising searching for the corresponding contextual URL in a database system.

5. The method of claim 4, further comprising searching for an additional attribute corresponding to the contextual URL.

6. The method of claim 5, wherein the additional attribute comprises one of a redirect attribute and a transfer attribute.

7. The method of claim 1, wherein the contextual URL comprises a URL that references a directory.

8. The method of claim 1, further comprising providing the contextual URL without storing an associated physical file.

9. A method for URL virtualization to provide a contextually relevant URL to a requesting agent, the method comprising:
   receiving a request for content hosted by a target server from the requesting agent, wherein the request includes a non-contextual URL;
   reading request header parameters in order to select a version of the requested content;
   accessing a URL storage area to determine that the non-contextual URL maps to a contextual URL, wherein the contextual URL is more contextually relevant and more human-readable than the non-contextual URL and wherein the URL storage area comprises a lookup table for matching the contextual URL to be supplied instead of the non-contextual URL;
   determining whether the contextual URL is a server-side transfer or a server-side redirect, wherein in a server-side redirect at least one of the non-contextual URL and contextual URL is mapped to an alternative URL;
   if the contextual URL is a server-side transfer, sending the content to the user browser for display and sending the contextual URL to the user browser for display in the user browser's address bar; and
   if the contextual URL is a server-side redirect, sending the content to the user browser for display and sending the alternative URL for display in the user browser's address bar.

10. The method of claim 9, further comprising searching for the corresponding contextual URL in a database system.

11. The method of claim 9, wherein the contextual URL comprises a URL that references a directory.

12. The method of claim 9, further comprising providing the contextual URL without storing an associated physical file.

13. A system embodied on a computer readable storage medium for URL virtualization that provides a contextually relevant URL to a requesting agent, the system comprising:
   a browser parameter determination mechanism for matching incoming request header parameters with a version of content, wherein the incoming request header parameters are indicative of a type of requesting agent and wherein the version of content is specific to the type of requesting agent;
   a URL lookup mechanism for accessing a URL storage area to determine whether a contextual URL exists for a non-contextual URL received from the requesting agent, wherein the contextual URL provides a human-readable description of the contents of the requested content version, wherein the URL storage area comprises a lookup table for matching the non-contextual URL to the contextual URL, and wherein the URL lookup mechanism inspects the lookup table to determine whether the contextual URL is a server-side redirect or a server-side transfer;
   a redirect path control to redirect the requesting agent to a new URL; and a transfer path control to execute the non-contextual URL while the contextual URL is provided for display.

14. The system of claim 13, further comprising a database for storing the contextual URL that maps to the non-contextual URL.

15. The system of claim 14, wherein the database additionally stores attributes corresponding to the contextual URL.

16. The system of claim 15, wherein the additional attribute comprises one of a redirect attribute and a transfer attribute.

17. The system of claim 13, wherein the contextual URL comprises a URL that references a directory.

18. The system of claim 13, further comprising a physical content file corresponding to the non-contextual URL and a mapping between the contextual URL and non-contextual URL without an additional physical content file.

* * * * *